United States Patent
Shinomiya

(10) Patent No.: US 8,456,535 B2
(45) Date of Patent: Jun. 4, 2013

(54) IMAGING APPARATUS AND IMAGING METHOD

(75) Inventor: Takeshi Shinomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 12/773,371

(22) Filed: May 4, 2010

(65) Prior Publication Data

US 2010/0289914 A1   Nov. 18, 2010

(30) Foreign Application Priority Data

May 12, 2009 (JP) ................................. 2009-115629
Mar. 25, 2010 (JP) ................................. 2010-070602

(51) Int. Cl.
*H04N 7/14* (2006.01)
*H04N 5/232* (2006.01)

(52) U.S. Cl.
USPC .................. 348/211.9; 348/14.12; 348/211.2; 348/211.6

(58) Field of Classification Search
USPC ................. 348/211.99–211.6, 211.9, 211.11, 348/14.12, 14.13
See application file for complete search history.

(56) References Cited

U.S. PATENT DOCUMENTS

| | | | |
|---|---|---|---|
| 7,460,781 B2 * | 12/2008 | Kanai et al. | 396/263 |
| 7,714,911 B2 * | 5/2010 | Yoshida | 348/231.5 |
| 8,189,059 B2 * | 5/2012 | Nozaki et al. | 348/211.3 |
| 2004/0183915 A1 * | 9/2004 | Gotohda et al. | 348/207.11 |
| 2005/0151852 A1 * | 7/2005 | Jomppanen | 348/218.1 |
| 2008/0158366 A1 * | 7/2008 | Jung et al. | 348/207.1 |

FOREIGN PATENT DOCUMENTS

JP   2004-260714 A   9/2004

* cited by examiner

*Primary Examiner* — Daniel M Pasiewicz
(74) *Attorney, Agent, or Firm* — Canon USA Inc. IP Division

(57) ABSTRACT

An imaging apparatus communicates with a second imaging apparatus connected to the imaging apparatus via a network, and analyzes a photographing frequency of the second imaging apparatus by receiving information indicating that the second imaging apparatus has performed photographing. When the analyzed photographing frequency exceeds a predetermined value, the imaging apparatus changes setting regarding image data to be recorded.

15 Claims, 11 Drawing Sheets

IMAGING APPARATUS AND IMAGING METHOD

BACKGROUND OF THE INVENTION

1. Field of the Invention

The present invention relates to an imaging apparatus and an imaging method, and more particularly to a technology suitably used for a digital video camera or a digital still camera that records a captured image as digital data.

2. Description of the Related Art

Recently, there has been a remarkable gain in popularity of a digital video camera and a digital still camera that convert a captured image into digital data to record the data. In the digital video camera and the digital still camera, a format or parameters of digital data to be recorded are determined according to user's setting or a recording medium.

For example, in the case of the digital video camera, resolution that the user can select may vary from one recording medium to another. The user can select quality of a moving image to be recorded by selecting a recording mode such as standard (SP) or long time (LP). This selection is allowed to the user because of inverse proportion between quality of a moving image to be recorded and a recording period of time. In other words, a recordable period of time (photographable period of time) is shorter when the user records a moving image in a high-quality mode, and longer when the user records the moving image in a low-quality mode.

As another example, in the case of the digital still camera, the user can select a recording format of resolution of image/compression rate/JPEG or RAW. The compression rate of the image and quality of the image to be recorded are inversely proportional to each other.

However, determination of parameters during image data generation is burdensome for the user, and hence substantially one parameter is fixed to be used in many cases. For example, in the case of the digital camera, when photographing is expected to last for a long period time on such an occasion as a wedding, the photographing is continued in a set state of a long photographing mode.

There has been an attempt made to automatically determine parameters during image data generation. For example, Japanese Patent Application Laid-Open No. 2004-260714 discusses a technology that, in a digital still camera including an image data reception function based on a communication function, changes a compression rate of image data based on image data received via communication and a remaining memory recording capacity of the digital still camera.

This technology enables recording of both of a received image and a captured image in a recording medium by reducing an image data size even when another image different from the captured image is received by the communication function. Thus, even without any user operation, a parameter that is a compression rate (parameter that becomes a parameter for image quality) can be automatically changed to be set.

However, according to contents described in Japanese Patent Application Laid-Open No. 2004-260714, it is only for the received image data that parameters can be automatically determined during image data generation, and other cases cannot be dealt with. For example, in the digital video camera, when the user captures a moving image in a long recording mode, the user cannot automatically change the mode to a high image quality mode by using a given event as a trigger.

SUMMARY OF THE INVENTION

The present invention is directed to an imaging apparatus and an imaging method capable of automatically changing setting regarding recording of image data according to a photographing status of surrounding imaging apparatuses.

According to an aspect of the present invention, an imaging apparatus includes an imaging unit including an image sensor configured to generate an image signal from an object image input via an imaging optical system, a recording unit configured to convert the image signal generated by the imaging unit into image data and to record the image data on a recording medium, a communication unit configured to communicate with a second imaging apparatus connected to the imaging apparatus via a network, an information reception unit configured to receive information indicating that the second imaging apparatus has performed photographing via the communication unit, a photographing frequency analysis unit configured to analyze a photographing frequency of the second imaging apparatus based on the information received by the information reception unit, and a setting change unit configured to change, when the photographing frequency analyzed by the photographing frequency analysis unit exceeds a predetermined value, setting regarding the image data to be recorded by the recording unit.

According to another aspect of the present invention, a method for controlling an imaging apparatus includes generating an image signal from an object image input via an imaging optical system, converting the generated image signal into image data and recording the image data on a recording medium, communicating with a second imaging apparatus connected to the imaging apparatus via a network, receiving information indicating that the second imaging apparatus has performed photographing, analyzing a photographing frequency of the second imaging apparatus based on the received information, and changing, when the analyzed photographing frequency exceeds a predetermined value, setting regarding the image data to be recorded.

According to yet another aspect of the present invention, there is provided a computer-readable storage medium storing a program for causing a computer to execute a method for controlling an imaging apparatus. The method includes generating an image signal from an object image input via an imaging optical system, converting the generated image signal into image data and recording the image data on a recording medium, communicating with a second imaging apparatus connected to the imaging apparatus via a network, receiving information indicating that the second imaging apparatus has performed photographing, analyzing a photographing frequency of the second imaging apparatus based on the received information, and changing, when the analyzed photographing frequency exceeds a predetermined value, setting regarding the image data to be recorded.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In a first exemplary embodiment of the present invention, an imaging apparatus is a digital video camera having a wireless (local area network) LAN function. An example of a surrounding imaging apparatus, which is located around the digital video camera, is a digital camera having a wireless LAN function.

Figure 1:
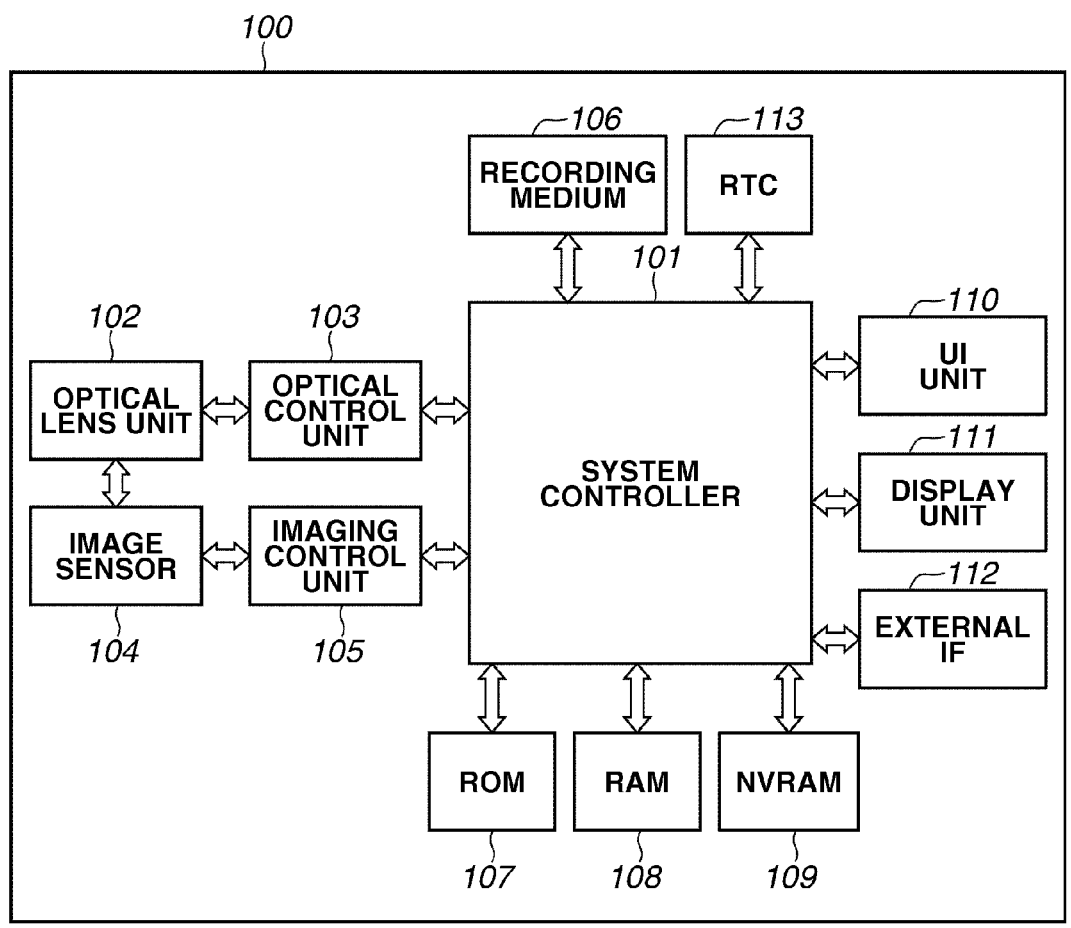
FIG. 1 is a block diagram illustrating an internal configuration example of an imaging apparatus (digital video camera or digital still camera) according to a first exemplary embodiment of the present invention.

FIG. 1 is a block diagram illustrating an internal configuration example of the imaging apparatus (digital video camera) according to the first exemplary embodiment of the present invention. In FIG. 1, a digital video camera 100 includes units 101 to 113 described below. The system controller 101 is configured to control the entire digital video camera 100. The system controller 101 controls each unit described below to record an image (moving image or a still image) according to user's setting and operation.

The optical lens unit 102 of an imaging optical system, which includes diaphragm, zoom, and focus functions, introduces an object image into the image sensor 104. The optical control unit 103 controls the optical lens unit 102 according to an instruction from the system controller 101. Specifically, the optical control unit 103 can adjust the diaphragm, zooming, and focusing of the optical lens unit 102.

The image sensor 104 converts light (image) introduced via the optical lens unit 102 into an electric signal. Generally, for the image sensor 104, a CMOS image sensor that uses a CMOS or a CCD image sensor that uses a CCD is used. The digital video camera 100 of the exemplary embodiment uses, for example, an image sensor that has 1920-by-1080 effective pixels during moving image photographing.

The imaging control unit 105 controls the image sensor 104 according to an instruction from the system controller 101. Specifically, the imaging control unit 105 reads data from the image sensor 104 according to photographing parameters such as sensitivity adjustment (gain control) of the image sensor 104.

The recording medium 106 functions as a recording apparatus for recording data according to an instruction from the system controller 101. For the recording medium 106, for example, a card type removable memory such as an SDHC memory card (SDHC is a registered trademark), a CompactFlash card (CompactFlash is a registered trademark), or a Memory Stick (registered trademark) is used. The system controller 101 converts a captured moving image into compressed digital data to record the data on the recording medium 106.

The digital video camera 100 of the exemplary embodiment uses the SDHC memory card as a recording medium, and fits the SDHC card into a memory card slot 311 described below. On the recording medium 106, image data or still image data generated by the system controller 102 by compressing and coding an image signal output from the imaging control unit 105 is recorded. A format of image data includes MPEG4-AVC/H. 264, and a format of audio data includes Dolby digital data. A format of still image data includes JPEG data or EXIF data.

The memory (ROM) 107 stores a program for controlling the digital video camera 100 and data used by the program. When the digital video camera 100 is turned ON by a power button 312 described below, the system controller 101 reads the program from the ROM 107 to start controlling of the digital video camera 100.

The RAM 108 is a rewritable memory that the program for controlling the digital video camera 100 uses as a work area. The RAM 108 is also used as a buffer for temporarily storing an image signal output from the imaging control unit 105, and at least data of 30 seconds can be buffered.

The NVRAM 109 is a rewritable nonvolatile memory for storing a setting value that a user designates by the UI unit 110 described below, and parameters that the digital video camera 100 stores over a power cycle.

The UI unit 110 transmits user's instruction to the digital video camera 100. The UI unit 110 includes a plurality of buttons (joystick 303, and function button 304 described below) and a dial (mode dial 309 described below).

The display unit 111 displays an image according to an instruction from the system controller 101. The display unit 111 includes a liquid crystal display (LCD 302 described below) and an LCD driver unit for controlling the liquid crystal display.

The display unit 111 displays a menu for performing various settings of the digital video camera 100 and an image (used as a framing finder) of the image signal output from the imaging control unit 105. The display unit 111 displays a captured image (used for checking photographing data) and an image (used as an image viewer) stored in the recording medium 106. An optional graphics image can be superimposed on each image to be displayed.

The external interface 112 functions as a communication unit for inputting/outputting data regarding the digital video camera 100 to the outside. Specifically, the external interface 112 includes an HDMI mini-output connector 402 described below, a USB connector 403, and a wireless LAN unit (not illustrated). The real time clock (RTC) 113 that functions to count time is used by the digital video camera 100 to recognize current time.

Figure 2:
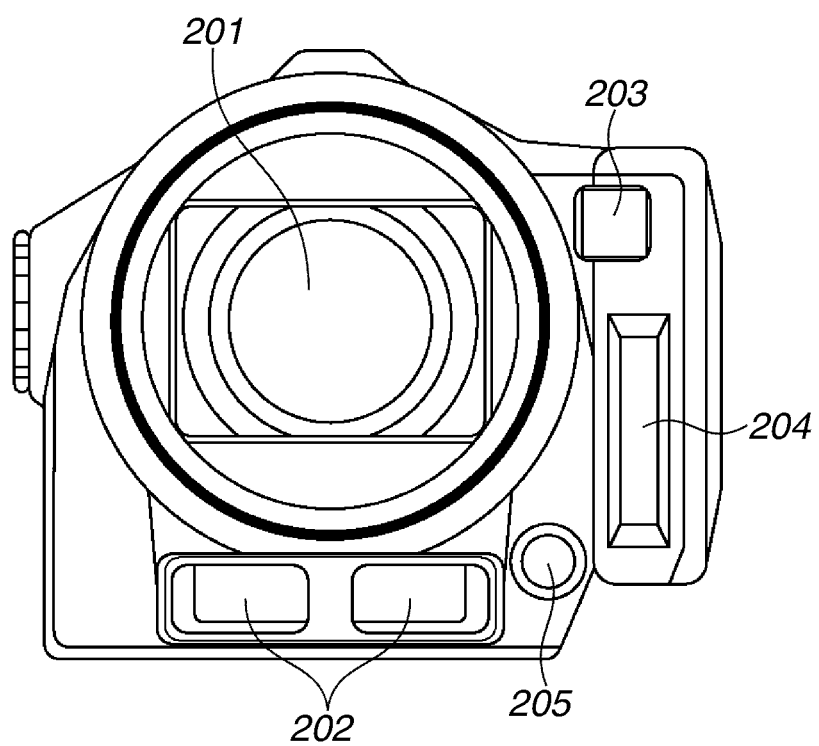
FIG. 2 is a front view illustrating the digital video camera according to the first exemplary embodiment of the present invention.
Figure 3:
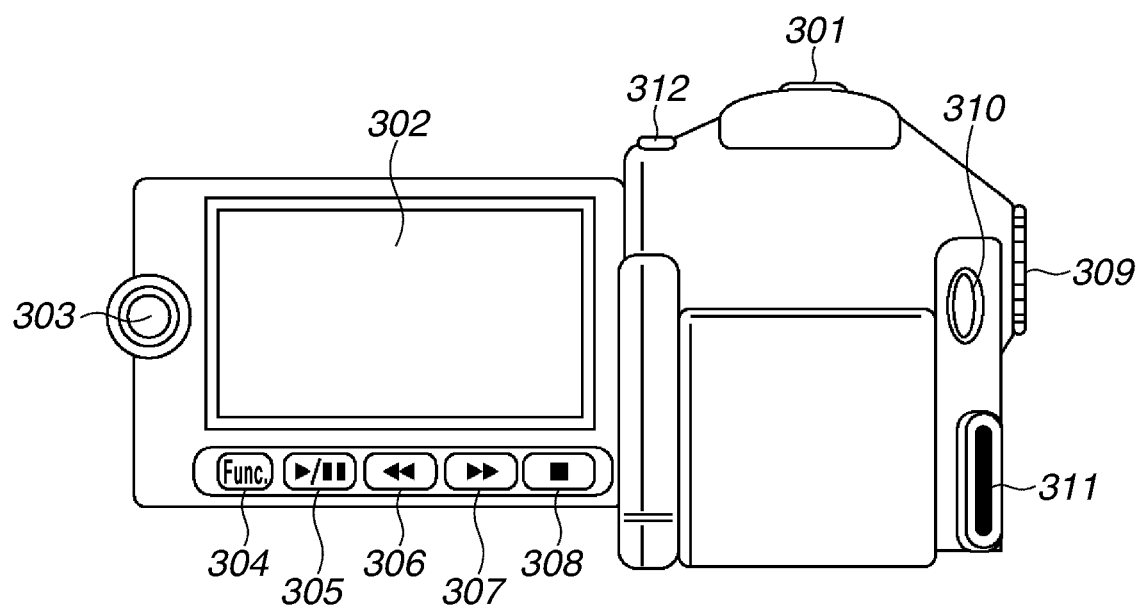
FIG. 3 is a rear view illustrating the digital video camera according to the first exemplary embodiment of the present invention.
Figure 4:
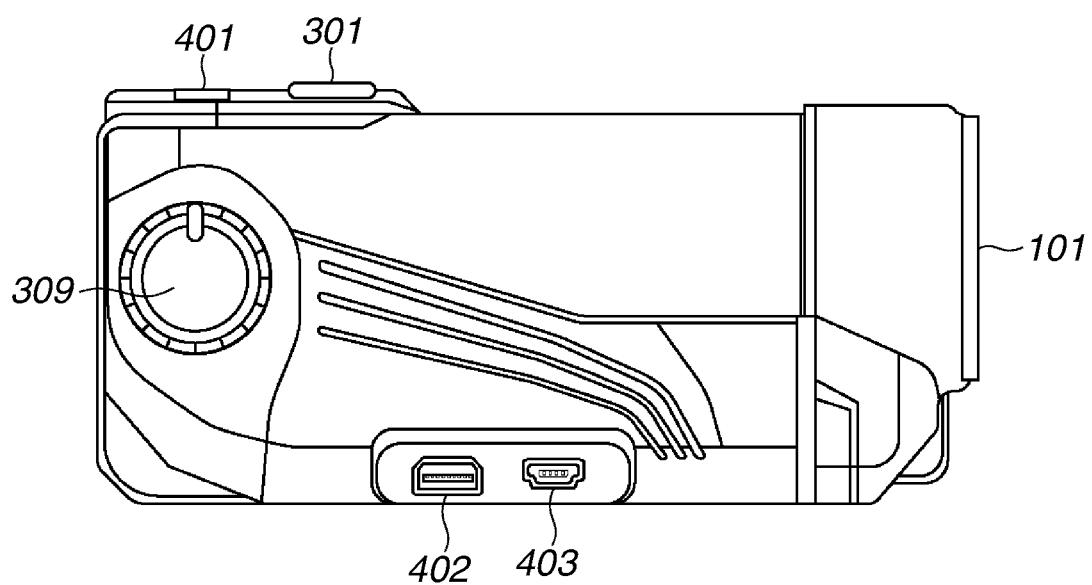
FIG. 4 is a side view illustrating the digital video camera according to the first exemplary embodiment of the present invention.

Each of FIGS. 2 to 4 illustrates an appearance configuration of the digital video camera 100 according to the first exemplary embodiment of the present invention: FIG. 2 is a front view, FIG. 3 is a rear view, and FIG. 4 is a side view. In FIG. 2, the digital video camera 100 includes a photographic lens 201. The photographic lens 201 has a zoom function, and is configured to change a zoom magnification by operating a zoom lever 301 described below. The photographic lens 201 corresponds to the optical lens unit 102 in FIG. 1.

An audio signal collected by an audio recording stereo microphone 202 is recorded together with an image input from the photographic lens 201 during moving image photographing on the recording medium 106. The digital video camera 100 includes an autofocus sensor 203. The digital video camera 100 has a function of performing automatic focusing by measuring a distance to an object and adjusting a focus of the photographic lens 201. A flash unit 204 emits light during still image photographing when necessary, thereby enabling photographing of a still image even under a dark condition. A mini-video light 205 is lit to enable bright photographing of an object when a moving image is photographed under a dark condition.

In FIG. 3, the zoom lever 301 is a lever-shaped button that can be shifted left and right. When this zoom lever is shifted left during photographing, zoom-out (wide-angle end) is set. When the zoom lever is shifted right, a zoom-in (telephoto end) is set. The liquid crystal display (LCD) 302 displays an object image during image photographing, thereby enabling checking of the image in progress of photographing. Before the start of photographing, the LCD 302 is used for adjusting a photographing range, displaying an operation menu described below, or reproducing captured image data to display the image.

The joystick 303 includes a press button in the center. The user can instruct an entry of an optional direction including up, down, left, and right, and selection by button pressing. The joystick 303 can be used for selecting an item from the operation menu described below.

The user can display the operation menu on the LCD 302 by pressing the function button 304. The operation menu is used for, for example, setting a photographing parameter such as resolution or a compression rate of image data to be recorded, or selecting image data that has been captured to reproduce and display the image data on the LCD 302.

When reproducing the captured image data, the user can start playback or pause by pressing a playback/pause button 305. The reproduced image data is displayed on the LCD 302 or output to an external device via the USB connector 403 described below. This button 305 can be used for instructing a start/a stop of photographing as in the case of a photographing start/stop button 310 described below.

A fast rewind button 306 is used for rewinding a moving image reproduced by the playback/pause button 305. When this button 306 is pressed during pause, slow reverse reproduction is performed. During photographing, zoom-out (wide-angle end) can be set by pressing the fast rewind button 306 as in the case of left-shifting of the zoom lever 301.

A fast forward button 307 is used for fast-forwarding the moving image reproduced by the playback/pause button 305. When this button 307 is pressed during pause, slow reproduction is performed. During photographing, zoom-in (telephoto end) can be set by pressing the fast forward button 307 as in the case of right-shifting of the zoom lever 301.

A stop button 308 is used for stopping reproduction of the moving image performed by the playback/pause button 305. During photographing, backlight correction for automatically adjusting brightness (exposure) can be instructed by pressing this button 308.

An operation mode of the digital video camera 100 can be changed by rotating the mode dial 309. The digital video camera 100 has four operation modes: a moving image photographing mode, a still image photographing mode, a moving image reproducing mode, and a still image reproducing mode. The start/stop button (photographing start/stop button) 310 is used for instructing a start or a stop of moving image photographing.

The memory card slot 311 is for fitting a memory card that is a removable (detachable) recording medium. Image data obtained by the digital video camera 100 is recorded in the memory card fitted in the memory card slot 311. The power button 312 turns ON/OFF the digital video camera 100.

In FIG. 4, a photo-button 401 is used for instructing photographing of a still image when the mode dial is set to the still image photographing mode. The photo-button 401 is a two-stage push-in button that can discriminately detect a half-pressed state and a fully-pressed state. In the half-pressed state, autofocus adjustment is started. In the fully-pressed state, a photographing operation for photographing a still image is started.

The HDMI mini-output connector (HDMI is a registered trademark) 402 is used for outputting image data from the digital video camera 100 to the external device. For example, when the digital video camera 100 is connected to a high-definition television set that includes an HDMI input connector by an HDMI cable, a high-quality image can be displayed on a large screen.

The USB connector 403 is used for connection with various devices such as a printer and a personal computer by a USB cable. For example, when the digital video camera 100 is connected to the printer, if the printer is PictBridge (registered trademark) compatible, a still image captured by the digital video camera 100 can be printed by the printer. When the digital video camera 100 is connected to the personal computer, moving image data or still image data stored in the digital video camera 100 can be copied (backed up) by the personal computer. Conversely, the moving image data/still image data from the personal computer can be written back into the digital video camera 100.

Figure 5:
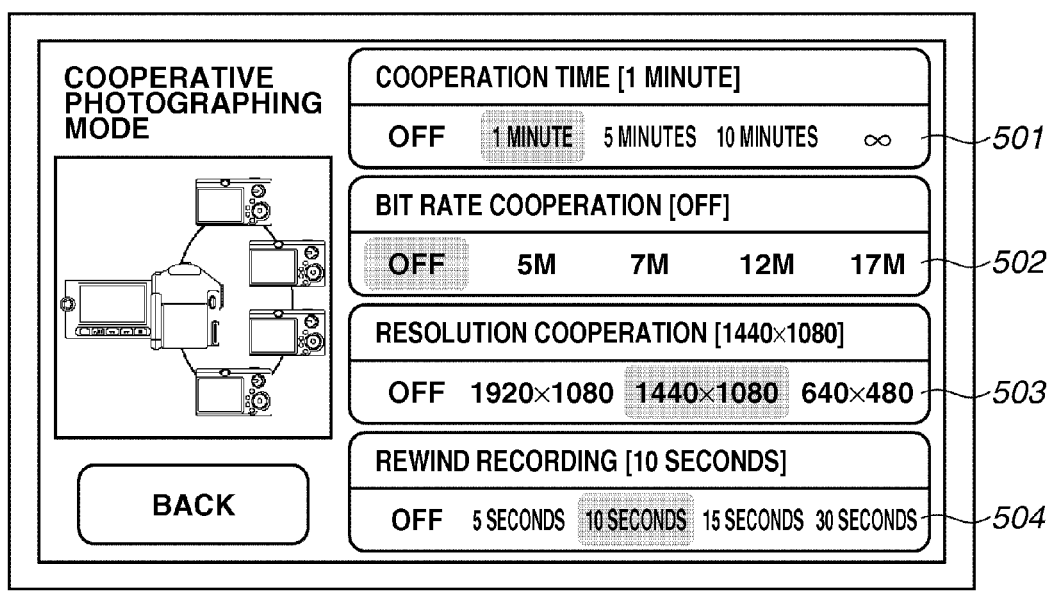
FIG. 5 illustrates an example of a menu screen for setting a cooperative operation of the digital video camera according to the first exemplary embodiment of the present invention.

FIG. 5 illustrates an example of a menu screen for setting a cooperative operation of the digital video camera 100 according to the first exemplary embodiment of the present invention, which is one of setting menus displayed on the LCD 302. This menu can be set regarding a cooperative function of the digital video camera 100 with surrounding digital cameras under control of the system controller 101. The cooperative function is a function of changing setting of a recording operation of the digital video camera 100 according to an operation status (especially a photographing frequency) of the surrounding digital cameras. In other words, the cooperative function is a function of performing condition setting to set a predetermined condition for changing setting of image data among a plurality of candidates. The cooperative function will be described below in detail referring to FIG. 7.

In FIG. 5, a menu item 501 is for designating a time for which cooperative photographing becomes valid. If OFF is selected n the menu item 501, the cooperative function becomes invalid irrespective of setting of menu items 502 to 504 described below. If an item of 1 minute/5 minutes/10 minutes is selected, the cooperative function set in the menu items 502 to 504 becomes valid for a designated period of time, and the state is automatically returned to a state before cooperation. If ∞ is selected, the state is not automatically returned.

The menu item 502 is for setting an automatic change function of a bit rate that is one of the cooperative functions. If OFF is selected in the menu item 502, the bit rate is not changed. If an item of 5M/7M/12M/17M is selected, image data coded based on a selected bit rate is recorded for a period designated in the menu item 501.

The menu item 503 is for setting an automatic change function of recording resolution that is one of the cooperative functions. If OFF is selected in the menu item 503, the recording resolution is not changed. If an item of 1920×1080/1440×1080/640×480 is selected, image data converted based on selected recording resolution is recorded for a period designated in the menu item 501.

The menu item 504 is for setting a rewind recording function that is one of the cooperative functions. If OFF is selected in the menu item 504, no rewind recording is performed. If an item of 5 seconds/10 seconds/15 seconds/30 seconds is selected, when starting a cooperative operation, by using the image signal buffered in the RAM 108, an image is recorded by going back by seconds designated in the menu item 504. The image recorded by going back is based on the bit rate and the recording resolution designated in the menu items 502 and 503.

Figure 6:
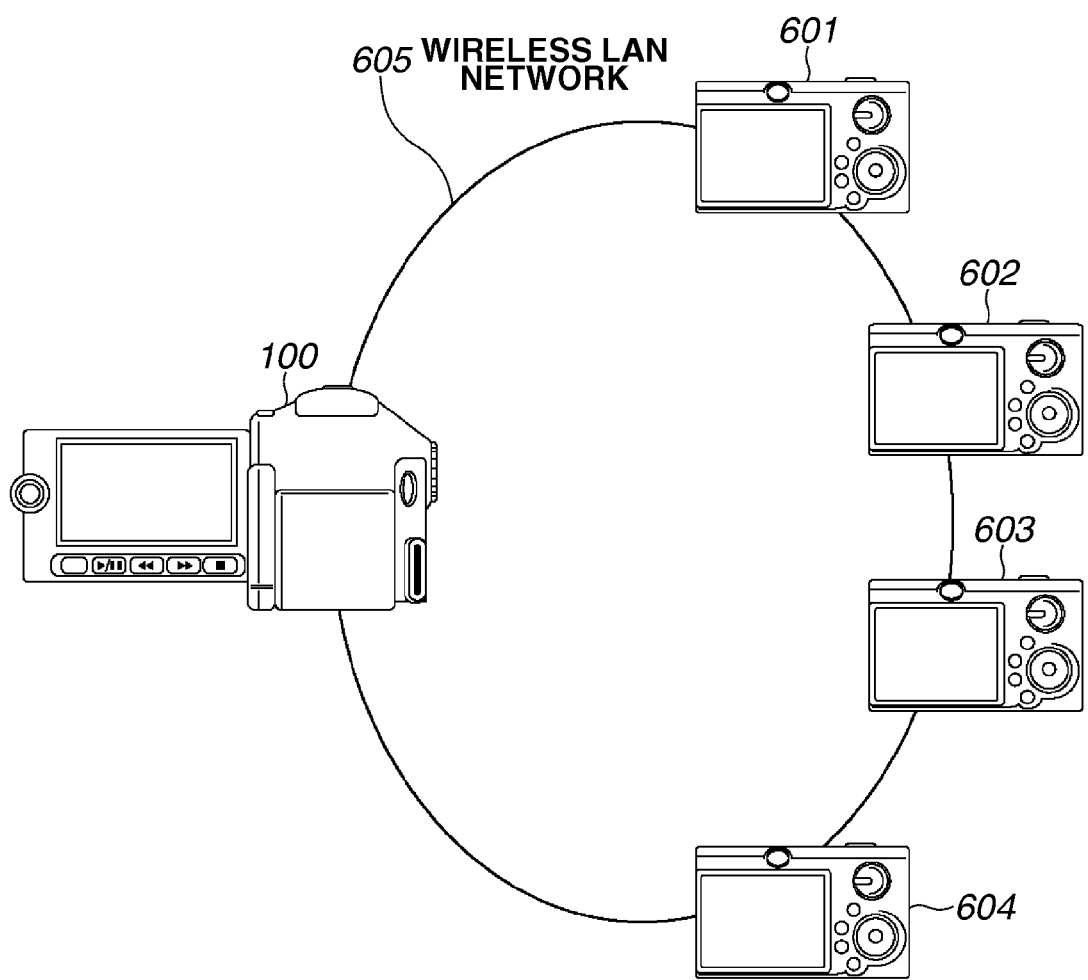
FIG. 6 schematically illustrates a relationship between the digital video camera of the first exemplary embodiment of the present invention and surrounding digital cameras.

FIG. 6 schematically illustrates a relationship between the digital video camera 100 of the first exemplary embodiment of the present invention and the surrounding digital cameras.

In FIG. 6, the digital video camera 100 of the exemplary embodiment has a wireless LAN function. The other digital cameras 601 to 604 also have wireless LAN functions. The digital video camera 100 and the digital cameras 601 to 604 belong to the same wireless LAN network 605, and can perform data communication with each other. Specifically, for each photographing, the digital cameras 601 to 604 broadcast photographing event data indicating the photographing via the wireless LAN network 605. By receiving this broadcast photographing event data, the digital video camera 100 can know that the surrounding digital cameras 601 to 604 have performed photographing in real time.

Figure 7:
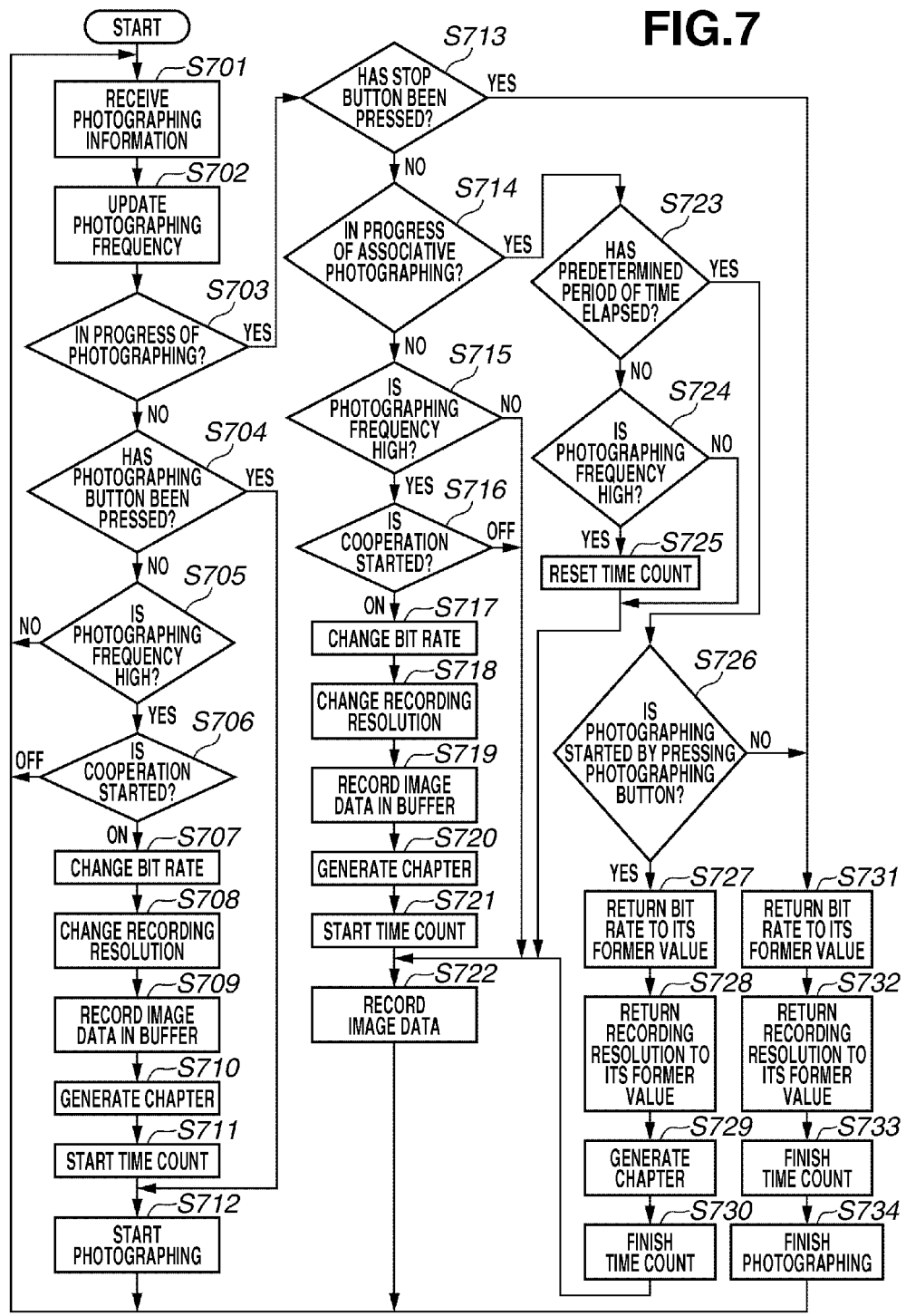
FIG. 7 is a flowchart illustrating an operation of the digital video camera according to the first exemplary embodiment of the present invention.

Next, referring to a flowchart of FIG. 7, an operation of the digital video camera 100 in the moving image photographing mode will be described. The flowchart of FIG. 7 illustrates an operation of the digital video camera according to the first exemplary embodiment of the present invention. In FIG. 7, steps S701 to S703 are always executed, steps S704 to S712 are executed during a photographing stop (photographing stand-by), and steps S713 to S734 are executed during photographing.

In step S701, the system controller 101 investigates a reception state of the wireless LAN unit at the external interface 112, and receives photographing event data if the data has been broadcast from the surrounding digital cameras 601 to 604.

In step S702, the system controller 101 calculates a photographing frequency of the surrounding digital cameras. In this case, the photographing frequency is defined as a number of photographing event data received for past one minute in step S701. In step S703, the system controller 101 determines whether the digital video camera 100 is in progress of photographing. If not in progress of photographing (NO in step S703), processing in steps S704 to S712 is executed. If in progress (YES in step S703), processing in steps S713 to S734 is executed.

Next, the processing in steps S704 to S712 during the photographing stop will be described. In step S704, the system controller 101 investigates whether the user has pressed the photographing start/stop button 310. If the user has pressed the photographing start/stop button 310 (YES in step S704), the system controller 101 determines that the user has started photographing, and proceeds to photographing start processing in step S712. If the user has not pressed the photographing start/stop button 310 (NO in step S704), in subsequent steps S705 and S706, the system controller 101 determines whether to automatically start photographing based on the cooperative function.

In step S705, the system controller 101 acquires the photographing frequency updated in step S702, and compares the photographing frequency with a predetermined value to determine whether the photographing frequency exceeds the predetermined value. If photographing event data has been received three times or more for past one minute, the system controller 101 determines that the photographing frequency is high at the surrounding digital cameras by analysis. If the photographing frequency is determined to be high (YES in step S705), the system controller 101 proceeds to step S706 for a cooperative operation. If a result of the analysis shows that the photographing frequency is not high (NO in step S705), the system controller 101 completes the processing during the photographing stop (steps S704 to S712), and returns to step S701.

In step S706, the system controller 101 determines whether OFF has been selected in the menu item 501. If OFF has been selected (YES in step S706), the system controller 101 completes the processing during the photographing stop (steps S704 to S712), and returns to step S701.

In step S707, according to a selection status of the menu item 502, the system controller 101 changes bit rate setting for recording a captured image. In this case, bit rate information before the change is separately stored. In step S708, according to a selection status of the menu item 503, the system controller 101 changes recording resolution for recording the captured image. In this case, recording resolution information before the change is separately stored.

In step S709, the system controller 101 compresses and codes an image signal buffered in the RAM 108. By the compressing and the coding, based on a selection status of the menu item 504, the system controller 101 generates image data according to the bit rate and the recording resolution designated in steps S707 and S708 to record the image data on the recording medium 106.

In step S710, the system controller 101 adds chapter information to the recorded image data for searching during reproduction. In step S711, the system controller 101 starts time count by using the RTC 113. In step S712, the system controller 101 changes the state of the digital video camera 100 to that of being in progress of photographing (in progress of a recording operation) to complete the processing during the photographing stop. Thus, in step S703, the state of being in progress of photographing (YES) is selected.

Next, the processing in steps S713 to S734 during photographing will be described. In step S713, the system controller 101 investigates whether the user has pressed the photographing start/stop button 310. If the user has pressed the photographing start/stop button 310 (YES in step S713), the system controller 101 determines that the photographing has stopped, and proceeds to the processing in steps S731 to S734 during the photographing stop.

In step S714, the system controller 101 determines whether a cooperative operation is in progress. The cooperative operation in progress means that photographing is in progress by changing a bit rate and recording resolution according to the menu items in FIG. 5. If the cooperative operation is in progress (YES in step S714), then in step S723 and following steps, the system controller 101 determines whether to continue the cooperative operation. If not in progress (NO in step S714), then in step S715 and following steps, the system controller 101 determines whether to perform a cooperative operation.

Processing in step S715 is similar to that in step S705. More specifically, the system controller 101 acquires the photographing frequency updated in step S702, and determines whether the photographing frequency exceeds the predetermined value. If photographing event data has been received three times or more for past one minute, the system controller 101 determines that the photographing frequency is high at the surrounding digital cameras. If the photographing frequency is determined to be high (YES in step S715), the system controller 101 proceeds to step S716 for a cooperative operation. If not high (NO in step S715), the system controller 101 proceeds to step S722 to continue the photographing processing.

Processing in step S716 is similar to that in step S706. More specifically, the system controller 101 determines whether OFF has been selected in the menu item 501. If OFF has been selected in the menu item 501 (YES in step S716), the system controller 101 proceeds to step S722 to continue the photographing. Processing in step S717 is similar to that in step S707. More specifically, according to a selection status of the menu item 502, the system controller 101 changes bit rate setting for recording a captured image. In this case, bit rate information before the change is separately stored.

Processing in step S718 is similar to that in step S708. More specifically, according to a selection status of the menu item 503, the system controller 101 changes recording resolution for recording the captured image. In this case, recording resolution information before the change is separately stored. Processing in step S719 is similar to that in step S709. More specifically, based on a selection status of the menu item 504, the system controller 101 records image data obtained by compressing and coding the image signal buffered in the RAM 108 according to the bit rate and the recording resolution designated in steps S717 and S718 on the recording medium 106.

Processing in step S720 is similar to that in step S710. More specifically, the system controller 101 adds chapter information to the recorded image data for searching during reproduction. Processing in step S721 is similar to that in step S711. More specifically, the system controller 101 starts time count by using the RTC 113.

In step S722, the system controller 101 changes the state of the digital video camera 100 to an image recording continuance state for continuously recording image data generated from an image signal output from the imaging control unit 105 on the recording medium 106. A bit rate and recording resolution in this case are those designated in the menu items 502 and 503 if a cooperative operation is in progress. If the cooperative operation is not in progress, the bit rate and the recording resolution are those which are default and set beforehand in menu items (not illustrated).

Next, processing in steps S723 to S730 during photographing when a cooperative operation is in progress will be described. In step S723, the system controller 101 determines whether the time designated in the menu item 501 has elapsed from the time count start (step S711 or step S721). If a result of the determination shows that the designated time has elapsed (YES in step S723), the system controller 101 proceeds to step S726 to complete the cooperative operation.

Processing in step S724 is similar to that in step S705 or step S715. More specifically, the system controller 101 acquires the photographing frequency updated in step S702, and determines whether the photographing frequency exceeds the predetermined value. In this case, the system controller 101 acquires photographing frequency information of the other digital cameras received within a predetermined period of time. If photographing event data has been received three times or more from the other digital cameras, the system controller 101 determines that a photographing frequency is high at the surrounding digital cameras. If the photographing frequency is determined to be high (YES in step S724), the system controller 101 proceeds to step S725 to adjust the time of a cooperative operation. If the photographing frequency is not high (NO in step S724), the system controller 101 proceeds to step S722 to continue the photographing processing. In step S725, the system controller 101 resets the time count started in step S711 or step S721. In other words, the system controller 101 starts new time count.

In step S726, the system controller 101 checks a factor of starting the photographing operation (recording operation) to determine processing at the time of a cooperative operation end (after the time designated in the menu item 501 has elapsed). In the digital video camera 100, photographing is started by pressing the photographing start/stop button 310 (determined in step S704) or by the cooperative function (determined in step S705 and in step S706). If the photographing has been started by the cooperative function (photographing has not been started by pressing the photographing start/stop button 310), the system controller 101 proceeds to step S731 to stop a recording operation when the cooperative operation is finished. On the other hand, if the photographing has not been started by the cooperative function (photographing has been started by pressing the photographing start/stop button 310), the system controller 101 proceeds to step S727 to continue the photographing even when the cooperation operation is finished.

In step S727, the system controller 101 returns the bit rate changed by the cooperative operation (step S707 or step S717) to its former value based on the stored bit rate information. In step S728, the system controller 101 returns the recording resolution changed by the cooperative operation (step S708 or S718) to its former value based on the stored recording resolution information.

Processing in step S729 is similar to that in step S710 or step S720. More specifically, the system controller 101 adds chapter information to the image data for searching during reproduction. In step S730, the system controller 101 completes the time count started in step S711 or step S721. Then, in step S722, the system controller 101 continues the image recording state. In this case, the values before the cooperative operation have been restored in step S727 and step S728, and hence a bit rate and recording resolution become those that are default and preset.

Processing in steps S731 to S734 is for completing photographing. Processing in step S731 is similar to that in step S727. More specifically, if the bit rate has been changed by the cooperative operation, the system controller 101 returns the bit rate to its former value. Processing in step S732 is similar to that in step S728. More specifically, if the recording resolution has been changed by the cooperative operation, the system controller 101 returns the recording resolution to its former value.

Processing in step S733 is similar to that in step S730. More specifically, if time count is in progress, the system controller 101 finishes the time count. In step S734, the system controller 101 completes the photographing (recording operation). In other words, thereafter, no image data is recorded on the recording medium 106 until photographing is started again.

Thus, according to the flowchart of FIG. 7, a digital video camera can be realized, which can automatically change various parameters regarding a photographing operation when the surrounding digital cameras frequently perform photographing. When the photographing frequency becomes higher at the surrounding digital cameras, the image quality (bit rate and recording resolution) of a captured image of the digital video camera can be automatically changed. Moreover, when the photographing frequency becomes lower at the surrounding digital video cameras, the image quality of the captured image of the digital video camera can be automatically returned to standard quality.

As a specific example, even when photographing is normally performed in a photographing mode of low image quality (low bit rate or low resolution) with a view to long-time photographing, in an important scene where the surrounding digital cameras frequently perform photographing, the mode can be automatically switched to a photographing mode of high image quality. Thus, an imaging apparatus can be provided, which is capable of recording important scenes with high image quality and changing an operation according to a surrounding photographing status.

A second exemplary embodiment of the present invention will be described by way of example where an imaging apparatus is a digital camera (still camera) having a wireless LAN function and surrounding imaging apparatuses are digital cameras having wireless LAN functions.

Referring to FIG. 1, which is a block diagram, an internal configuration of the imaging apparatus (digital camera) according to the second exemplary embodiment of the present invention will be described. A digital camera 800 of the present exemplary embodiment is similar in configuration to the digital video camera 100 illustrated in FIG. 1, and includes units 101 to 113 described below.

The system controller 101 is configured to control the entire digital camera 800. The system controller 101 controls each unit described below to record an image (still image) according to user's setting and operation.

The optical lens unit 102 of an imaging optical system, which includes a diaphragm, zoom, and focus functions, introduces an object image into the image sensor 104. The optical control unit 103 controls the optical lens unit 102 according to an instruction from the system controller 101. Specifically, the optical control unit 103 can adjust the diaphragm, zooming and focusing of the optical lens unit 102.

The image sensor 104 converts light (image) introduced via the optical lens unit 102 into an electric signal. Generally, a CMOS image sensor that uses a CMOS or a CCD image sensor that uses a CCD is used. The digital camera 800 of the present exemplary embodiment uses, for example, an image sensor that has 3648-by-2736 effective pixels.

The imaging control unit 105 controls the image sensor 104 according to an instruction from the system controller 101. Specifically, the imaging control unit 105 reads data from the image sensor according to photographing parameters such as sensitivity adjustment (gain control) of the image sensor.

The recording medium 106 functions as a recording apparatus for recording data according to an instruction from the system controller 101. The system controller 101 converts a captured still image into compressed digital data to record the data in the recording medium 106. The digital camera 800 of the exemplary embodiment uses an SDHC memory card as a recording medium. On the recording medium 106, still image data (JPEG data) or uncompressed still image data (RAW data) generated by the system controller 101 by compressing and coding an image signal output from the imaging control unit 105 is recorded.

The memory (ROM) 107 stores a program for controlling the digital camera 800 and data used by the program. When the digital camera 800 is turned ON by a power button 903 described below, the system controller 101 reads the program from the ROM 107 to start controlling of the digital camera 800.

The RAM 108 is a rewritable memory that the program for controlling the digital camera 800 uses as a work area. The RAM 108 is also used as a buffer for temporarily storing an image signal output from the imaging control unit 105, and at least data of 30 seconds can be buffered.

The NVRAM 109 is a rewritable nonvolatile memory for storing a setting value that a user designates by the UI unit 110 described below, and parameters that the digital camera 800 stores over a power cycle. The UI unit 110 transmits user's instruction to the digital camera 800. The UI unit 110 includes a plurality of buttons 904 and a shutter button 801.

The display unit 111 displays an image according to an instruction from the system controller 101. The display unit 111 includes a liquid crystal display (LCD 901 described below) and an LCD driver unit for controlling the liquid crystal display. The display unit 111 displays a menu for performing various settings of the digital camera 800 and an image (used as a framing finder) of the image signal output from the imaging control unit 105. The display unit 111 displays a captured image (used for checking photographing data) and an image (used as an image viewer) stored in the recording medium 106. An optional graphics image can be superimposed on each image to be displayed.

The interface 112 functions as a communication unit for inputting/outputting data regarding the digital camera 800 to the outside. Specifically, the interface 112 includes a USB connector (not illustrated), and a wireless LAN unit (not illustrated). The real time clock (RTC) 113 functions to count time. The digital camera 800 uses the RTC 113 to recognize current time.

Figure 8:
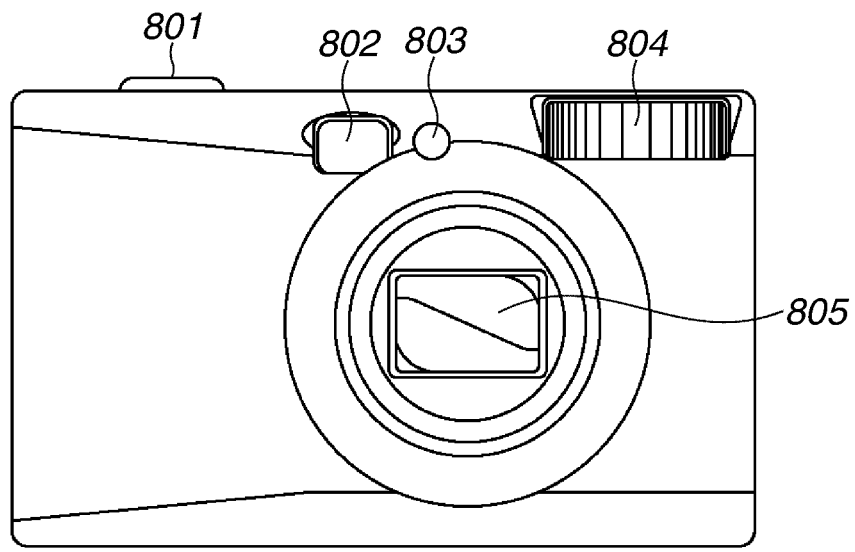
FIG. 8 is a front view illustrating a digital camera according to a second exemplary embodiment of the present invention.
Figure 9:
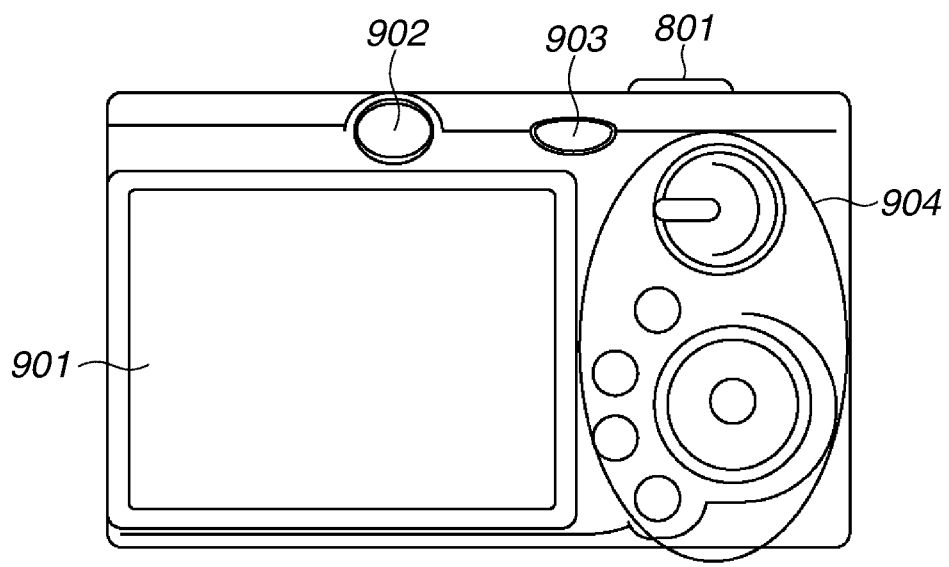
FIG. 9 is a rear view illustrating the digital camera according to the second exemplary embodiment of the present invention.

Each of FIGS. 8 and 9 illustrates an appearance configuration of the digital camera 800 according to the second exemplary embodiment of the present invention: FIG. 8 is a front view, and FIG. 9 is a rear view. In FIG. 8, the shutter button 801 is a two-stage push-in switch that can discriminately detect a half-pressed state and a fully-pressed state. In the half-pressed state, autofocus adjustment is started. In the fully-pressed state, a photographing operation for photographing a still image is started.

A finder window 802 enables checking of an object image from a finder eyepiece 902 described below when a composition is determined during photographing. A lamp light-emitting unit 803 is used as an AF auxiliary light/red-eye reduction lamp or a self-timer lamp.

A flash unit 804 emits light during photographing when necessary, thereby enabling photographing of a still image even under a dark condition. A photographic lens 205 corresponds to the optical lens unit 102 in FIG. 1.

In FIG. 9, a liquid crystal display (LCD) 901 is used within a photographing range (determination of a composition) before the start of photographing, displaying an operation menu described below, or reproducing and displaying captured image data.

From the finder eyepiece 902, the user can optically check the object image. The digital camera 800 is turned ON/OFF by a power button 903. A user interface unit 810 includes a button group 904. The user displays the menu of the digital camera 800 or sets various parameters by using these buttons.

Figure 10:
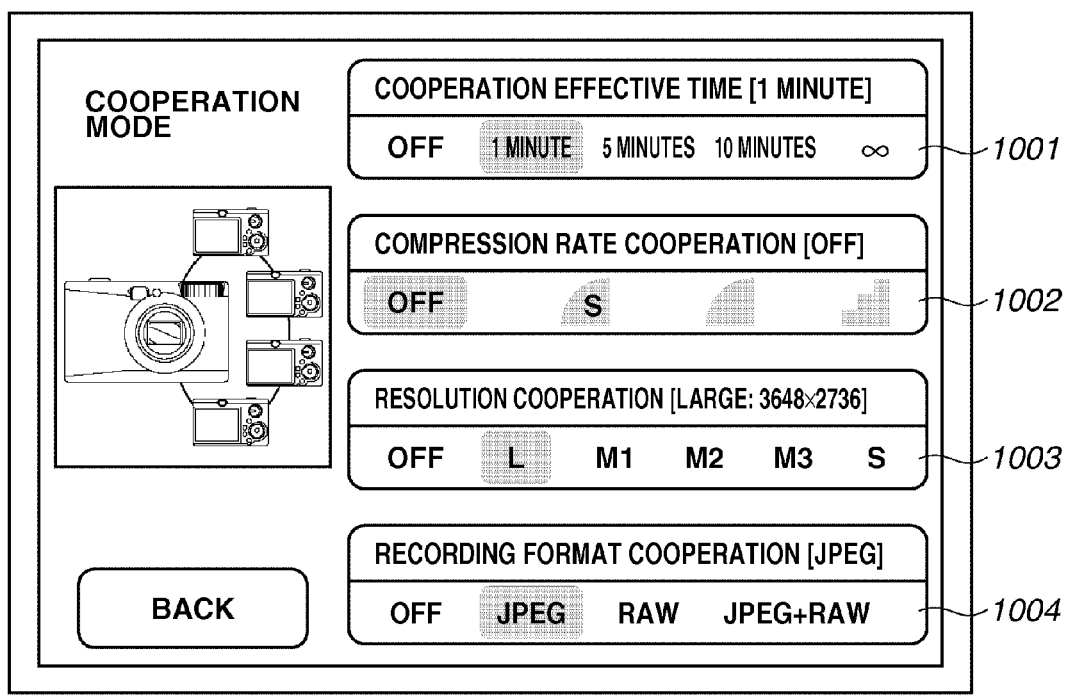
FIG. 10 illustrates an example of a menu screen for setting a cooperative operation of the digital camera according to the second exemplary embodiment of the present invention.

FIG. 10 illustrates an example of a menu screen for setting a cooperative operation of the digital camera 800 according to the second exemplary embodiment of the present invention, which is one of setting menus displayed on the LCD 901. This menu can be set regarding a cooperative function of the digital camera 800 with surrounding digital cameras under control of the system controller 101. The cooperative function is a function of changing setting of a photographing operation of the digital camera 800 according to an operation status (especially a photographing frequency) of the surrounding digital cameras. The cooperative function will be described below in detail referring to FIG. 11.

In FIG. 10, a menu item 1001 is for designating a time for which cooperative photographing becomes valid. If OFF is selected in the menu item 1001, the cooperative function becomes invalid irrespective of setting of menu items 1002 to 1004 described below. If an item of 1 minute/5 minutes/10 minutes is selected, the cooperative function set in the menu items 1002 to 1004 becomes valid for a designated period of time, and the state is automatically returned to a state before cooperation. If ∞ is selected, the state is not automatically returned.

The menu item 1002 is for setting an automatic change function of a compression rate that is one of the cooperative functions. If OFF is selected in the menu item 1002, the compression rate is not changed. If an icon other than OFF is selected, image data compressed and coded based on a selected compression rate (superfine, fine, or normal) is recorded for a period designated in the menu item 1001.

The menu item 1003 is for setting an automatic change function of recording resolution that is one of the cooperative functions. If OFF is selected in the menu item 1003, the recording resolution is not changed. If an item of L, M1, M2, M3, or S is selected, image data converted based on selected recording resolution (3648×2736, 2816×2112, 2272×1704, or 640×480) is recorded for a period designated in the menu item 1001.

The menu item 1004 is for setting an automatic change function of a recording format that is one of the cooperative functions. If OFF is selected in the menu item 1004, the recording format is not changed. If an item of JPEG/RAW/JPEG+RAW is selected, the image data is recorded in the selected recording format for a period designated in the menu item 1001. When RAW is selected, the image data is recorded in a RAW data format (obtained by directly converting a signal output from the image sensor 104 into data, and not compressed) irrespective of setting of the menu items 1002 and 1003.

Referring to FIG. 6, a relationship between the digital camera 800 of the present exemplary embodiment and the surrounding digital cameras will be described.

In FIG. 6, the digital video camera 100 corresponds to the digital camera 800 of the present exemplary embodiment. The other digital cameras 601 to 604 have wireless LAN functions. The digital camera 800 and the digital cameras 601 to 604 belong to the same wireless LAN network 605, and can perform data communication with each other. As in the case of the first exemplary embodiment, for each photographing, the digital cameras 601 to 604 broadcast photographing event data indicating the photographing via the wireless LAN network 605, and the digital camera 800 can receive the data. The digital camera 800 includes a transmission function of generating photographing event data according to own photographing, and broadcasting the data via the wireless LAN network 605.

Figure 11:
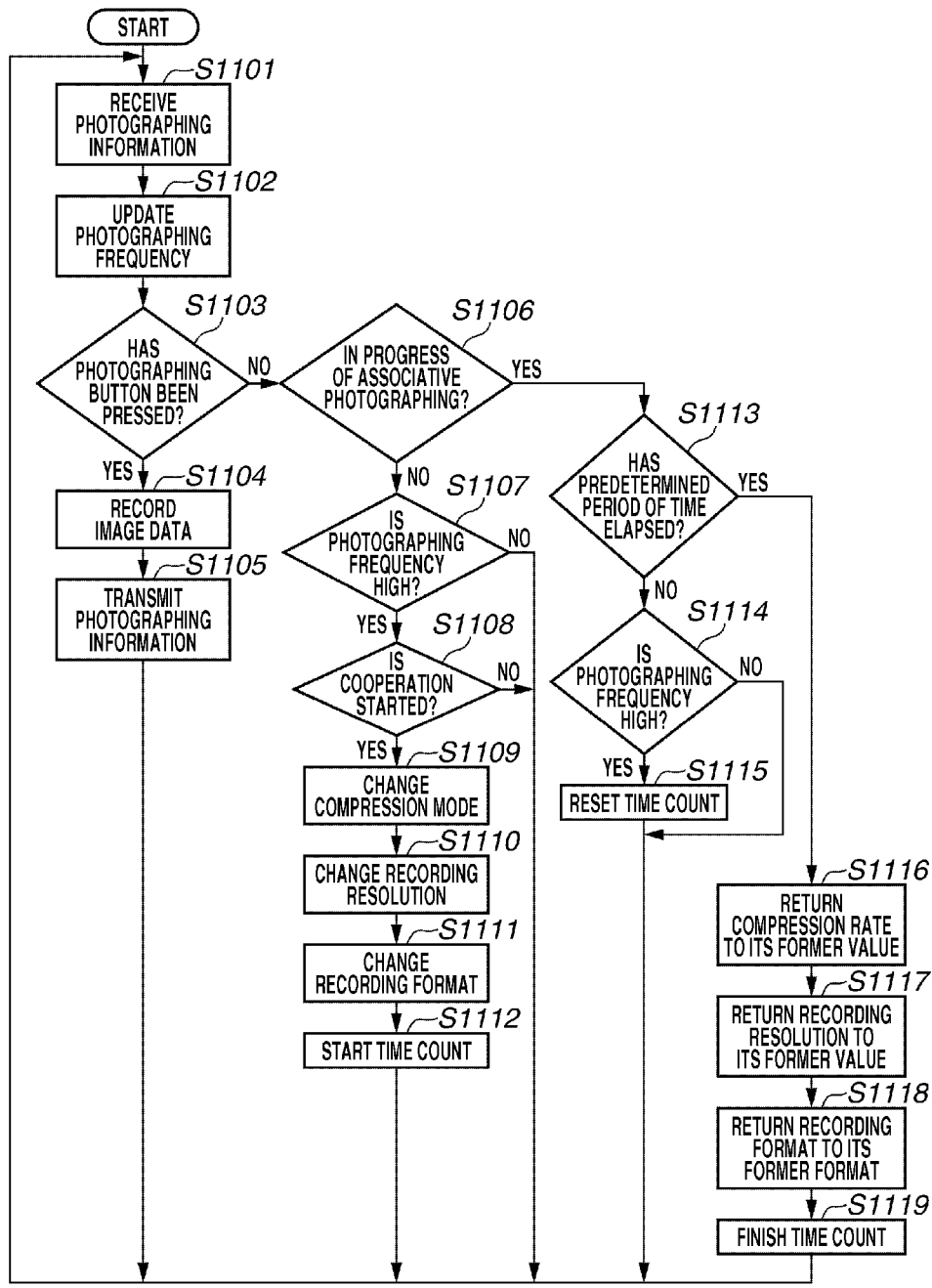
FIG. 11 is a flowchart illustrating an operation of the digital camera according to the second exemplary embodiment of the present invention.

Next, referring to the flowchart of FIG. 11, an operation of the digital camera 800 in the photographing mode will be described. The flowchart of FIG. 11 illustrates an operation of the digital camera according to the second exemplary embodiment of the present invention. In FIG. 11, steps S1101 to S1103 are always executed, steps S1104 to S1105 are executed during photographing, and steps S1106 to S1119 are executed during photographing stand-by.

In step S1101, the system controller 101 investigates a reception state of the wireless LAN unit at the external interface 112, and receives photographing event data if the data has been broadcast from the surrounding digital cameras 601 to 604. In step S1102, the system controller 101 calculates a photographing frequency of the surrounding digital cameras. In this case, the photographing frequency is defined as a number of photographing event data received for past one minute in step S1101.

In step S1103, the system controller 101 determines whether the shutter button 801 has been fully pressed. If a result of the determination shows that the shutter button 801 has been fully pressed (YES in step S1103), the system controller 101 proceeds to step S1104 to perform photographing. If not fully pressed (NO in step S1103), the system controller 101 proceeds to step S1106 to continue the photographing stand-by state.

In step S1104, the system controller 101 records image data generated from an image signal output from the imaging control unit 105. In this case, if a cooperative operation is in progress, a compression rate, recording resolution and a recording format are those designated in the menu items 1002, 1003 and 1004. If not in progress, a compression rate, recording resolution and a recording format that are default and preset in menu items (not illustrated) are employed.

In step S1105, the system controller 101 generates photographing event data indicating photographing execution, and broadcasts the data via the wireless LAN network by using the wireless LAN unit at the external interface 112. This arrangement is enabled because when one of digital cameras connected via the network is a digital camera of the present exemplary embodiment, photographing event data of this digital camera can be used for updating the photographing frequency.

In step S1106, the system controller 101 determines whether a cooperative operation is in progress. The cooperative operation in progress means a state where a compression rate, recording resolution, and a recording format have been changed according to the menu items in FIG. 10. If the cooperative operation is in progress (YES in step S1106), then in step S1113 and following steps, the system controller 101 determines whether to continue the cooperative operation. If the cooperative operation is not in progress (NO in step S1106), then in step S1107 and following steps, the system controller 101 determines whether to continue the cooperative operation. In step S1107, the system controller 1107 acquires the photographing frequency updated in step S1102, and determines whether the photographing frequency exceeds a predetermined value.

If photographing event data has been received three times or more for past one minute, the system controller 101 determines that the photographing frequency is high at the surrounding digital cameras by analysis. If the photographing frequency is determined to be high (YES in step S1107), the system controller 101 proceeds to step S1108 for a cooperative operation. If a result of the analysis shows that the photographing frequency is not high (NO in step S1107), the system controller 101 returns to step S1101 to continue the photographing stand-by state.

In step S1108, the system controller 101 determines whether OFF has been selected in the menu item 1001. If OFF has been selected (YES in step S1108), the system controller 101 returns to step S1101 to continue the photographing stand-by state.

In step S1109, according to a selection status of the menu item 1102, the system controller 101 changes a compression rate for recording a captured image. In this case, compression rate information before the change is separately stored. In step S1110, according to a selection status of the menu item 1103, the system controller 101 changes recording resolution for recording the captured image. In this case, recording resolution information before the change is separately stored.

In step S1111, according to a selection status of the menu item 1004, the system controller 101 changes a recording format for recording the image data. In this case, recording format information before the change is separately stored.

In step S1112, the system controller 101 starts time count by using the RTC 113.

Next, processing in steps S1113 to S1119 in the photographing stand-y state while the cooperative operation is in progress will be described.

In step S1113, the system controller 101 determines whether a period of time designated in the menu item 1001 has elapsed from the start of the time count (step S1112). If the designated period of time has elapsed (YES in step S1113), the system controller 101 proceeds to step S1116 to complete the cooperative operation.

Processing in step S1114 is similar to that in step S1107. More specifically, the system controller 101 acquires the photographing frequency updated in step S112, and determines whether the photographing frequency exceeds a predetermined value. If photographing event data has been received three times or more for past one minute, the system controller 101 determines that the photographing frequency is high at the surrounding digital cameras. If the photographing frequency is determined to be high (YES in step S1114), the system controller 101 proceeds to step S1115 to adjust a period of time of the cooperative operation. If not high (NO in step S1114), the system controller 101 proceeds to step S1101 to continue the photographing processing.

In step S1115, the system controller 101 resets the time count started in step S1112. In other words, the system controller 101 starts new time count. Processing in steps 1116 to S1119 is for completing the cooperative operation.

In step S1116, the system controller 101 returns the compression rate changed by the cooperative operation (step S1109) to its former value based on the stored compression rate information. In step S1117, the system controller 101 returns the recording resolution changed by the cooperative operation (step S1110) to its former value based on the stored recording resolution information. In step S1118, the system controller 101 returns the recording format changed by the cooperative operation (step S1111) to its former value based on the stored recording format information. In step S1119, the system controller 101 completes the time count started in step S1112. Then, returning to step S1101, the system controller 101 continues the photographing stand-by state.

Thus, according to the flowchart of FIG. 11, a digital camera can be realized, which can automatically change various parameters regarding a photographing operation when the surrounding digital cameras frequently perform photographing. When the photographing frequency becomes higher at the surrounding digital cameras, the image quality (compression rate and recording resolution) of a captured image of the digital camera and a recording format can be automatically changed. Moreover, when the photographing frequency becomes lower at the surrounding digital cameras, the image quality of the captured image of the digital camera and the recording format can be automatically returned to standard quality and a standard format.

As a specific example, even when photographing is normally performed in a photographing mode of low image quality (normal compression rate or low resolution), in an important scene where the surrounding digital cameras frequently perform photographing, the mode can be automatically switched to a photographing mode of high image quality. If photographing is performed during this period, the important scene can be recorded with high quality. Thus, an imaging apparatus can be provided, which is capable of changing an operation according to a surrounding photographing status.

In the exemplary embodiments, the imaging apparatus are the digital video camera and the digital camera. However, the present invention is not limited to these cameras. The invention may be applied to other imaging apparatus such as a camera-integrated mobile phone.

In the exemplary embodiments, the wireless LAN units are used as the communication units. However, the present invention is not limited to these units. Other communication systems such as a wired LAN (Ethernet) or a mobile phone network may be used.

In the exemplary embodiments, as examples of recording operation changes, the change of the start of the moving image photographing and the bit rate, the change of the recording resolution, and the change of the compression rate have been described. However, the present invention is not limited to these examples. Other parameters such as photographing sensitivity (ISO sensitivity) or a color tone may be changed.

The units constituting the imaging apparatus of the exemplary embodiments of the present invention and the steps of the imaging method can be realized by executing a program stored in a RAM or a ROM of the computer. This program and a computer-readable recording medium (storage medium) for recording the program are within the present invention.

The present invention can be implemented in the form of, for example, a system, an apparatus, a method, a program or a recording medium (storage medium). Specifically, the invention may be applied to a system that includes a plurality of devices, or an apparatus that includes one device.

The present invention includes a case where software programs for realizing the functions of the exemplary embodiments (in the exemplary embodiments, programs corresponding to the flowcharts of FIGS. 7 and 11) are supplied to a system or an apparatus directly or from a remote place. The invention includes a case where the computer of the system or the apparatus reads and executes the supplied program codes to achieve the functions.

Thus, the program codes themselves installed in the computer to realize the functional processing of the exemplary embodiments realize the present invention. In other words, the invention includes the computer programs themselves for realizing the functional processing of the exemplary embodiments.

In this case, any form such as object code, a program executed by an interpreter, or script data supplied to an OS may be employed as long as it has a program function.

As recording media (storage media) for supplying programs, for example, there are a floppy disk, a hard disk, an optical disk and a magneto-optical disk. There are also an MO, a CD-ROM, a CD-R, a CD-RW, a magnetic tape, a nonvolatile memory card, a ROM, and a DVD (DVD-ROM or DVD-R).

As a method for supplying programs, there is a method for connection with a website on the Internet by using a browser of a client computer. The programs can be supplied by downloading the computer programs themselves of the exemplary embodiments or a compressed file containing an automatic installing function on a recording medium (storage medium).

The functions of the exemplary embodiments can be realized by dividing the program codes of the programs into a plurality of files and downloading each file from different websites. In other words, a WWW server that enables a plurality of users to download the program files for realizing the functional processing of the exemplary embodiments by a computer is also within the present invention.

As other methods, the programs of the exemplary embodiments are encrypted, and stored in a recording medium (storage medium) such as a CD-ROM to be distributed to users. Uses who satisfy predetermined conditions are allowed to download key information for decrypting the programs from a website via the Internet. The functions of the exemplary embodiments can be realized by executing the encrypted programs based on the key information, and installing the programs in the computer.

The computer executes the read programs, thereby realizing the functions of the exemplary embodiments. Based on program instructions, an OS operating in the computer performs a part or all parts of actual processing, and the processing can realize the functions of the exemplary embodiments.

As other methods, the programs read from the recording medium (storage medium) are written in a memory provided in a function expansion board inserted into the computer or a function expansion unit connected to the computer. Based on program instructions, a CPU provided in the function expansion board or the function expansion unit executes a part or all parts of actual processing, and the processing realizes the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-115629 filed May 12, 2009 and No. 2010-070602 filed Mar. 25, 2010, which are hereby incorporated by reference herein in their entirety.

What is claimed is:

1. An imaging apparatus comprising:
   an imaging unit that generates an image signal from an object image input via an imaging optical system;
   a recording unit that converts the image signal generated by the imaging unit into image data and to record the image data on a recording medium;
   a communication unit that communicates with a second imaging apparatus;
   an information reception unit that receives information indicating that the second imaging apparatus has performed photographing via the communication unit;
   a photographing frequency analysis unit that analyzes a photographing frequency of the second imaging apparatus based on the information received by the information reception unit; and
   a setting change unit that changes, in response to the photographing frequency analyzed by the photographing frequency analysis unit exceeds a predetermined value, setting regarding the image data to be recorded by the recording unit.

2. The imaging apparatus according to claim 1, wherein the photographing frequency analysis unit analyzes the photographing frequency based on a number of times of receiving the information within a predetermined period of time.

3. The imaging apparatus according to claim 1, further comprising a condition setting unit that sets a predetermined condition among a plurality of candidates for changing the setting by the setting change unit.

4. The imaging apparatus according to claim 1, wherein, in response to the photographing frequency analyzed by the photographing frequency analysis unit exceeds a predetermined value, the setting change unit changes setting of image quality of the image data to be recorded by the recording unit.

5. The imaging apparatus according to claim 4, wherein, in response to the photographing frequency analyzed by the photographing frequency analysis unit exceeds a predetermined value, the setting change unit changes setting of a bit rate of the image data to be recorded by the recording unit.

6. The imaging apparatus according to claim 4, wherein, in response to the photographing frequency analyzed by the photographing frequency analysis unit exceeds a predetermined value, the setting change unit changes setting of recording resolution of the image data to be recorded by the recording unit.

7. The imaging apparatus according to claim 4, wherein, in response to the photographing frequency analyzed by the photographing frequency analysis unit exceeds a predetermined value, the setting change unit changes setting of a compression rate of the image data to be recorded by the recording unit.

8. The imaging apparatus according to claim 4, wherein, in response to the photographing frequency analyzed by the photographing frequency analysis unit exceeds a predetermined value, the setting change unit changes setting of a recording format of the image data to be recorded by the recording unit.

9. The imaging apparatus according to claim 1, wherein, in response to the photographing frequency analyzed by the photographing frequency analysis unit exceeds a predetermined value, the setting change unit changes setting from a state of not recording the image data to a state of recording the image data by the recording unit.

10. The imaging apparatus according to claim 1, wherein, in response to the photographing frequency analyzed by the photographing frequency analysis unit exceeds a predetermined value, the setting change unit adds chapter information to the setting-changed image data to be recorded by the recording unit.

11. The imaging apparatus according to claim 1, further comprising a buffer that temporarily stores the image signal,
   wherein when the photographing frequency analyzed by the photographing frequency analysis unit exceeds the predetermined value, the setting change unit changes the setting based on the image signal stored in the buffer.

12. The imaging apparatus according to claim 1, further comprising a time count unit that counts a passage of time after the setting change unit changes the setting,
   wherein the setting change unit returns the changed setting to the setting before the change in response to the passage of time counted by the time count unit reaching a designated passage of time.

13. The imaging apparatus according to claim 12, wherein in response to the photographing frequency analyzed by the photographing frequency analysis unit exceeds the predetermined value, if the state has been changed from a state of not recording the image data to a state of recording the image data by the recording unit, the setting change unit stops a recording operation of the recording unit in response to the passage of time counted by the time count unit reaching a designated passage of time.

14. A method for controlling an imaging apparatus, the method comprising:
   generating an image signal from an object image input via an imaging optical system;

converting the generated image signal into image data and recording the image data on a recording medium;

communicating with a second imaging apparatus connected to the imaging apparatus via a network;

receiving information indicating that the second imaging apparatus has performed photographing;

analyzing a photographing frequency of the second imaging apparatus based on the received information; and changing, in response to the analyzed photographing frequency exceeds a predetermined value, setting regarding the image data to be recorded.

15. A non-transitory computer-readable storage medium storing a program for causing a computer to execute a method for controlling an imaging apparatus, the method comprising:

generating an image signal from an object image input via an imaging optical system;

converting the generated image signal into image data and recording the image data on a recording medium;

communicating with a second imaging apparatus connected to the imaging apparatus via a network;

receiving information indicating that the second imaging apparatus has performed photographing;

analyzing a photographing frequency of the second imaging apparatus based on the received information; and changing, in response to the analyzed photographing frequency exceeds a predetermined value, setting regarding the image data to be recorded.

* * * * *